A. LIGHT.
RAIL BOND.
APPLICATION FILED SEPT. 17, 1908.
916,882.
Patented Mar. 30, 1909.
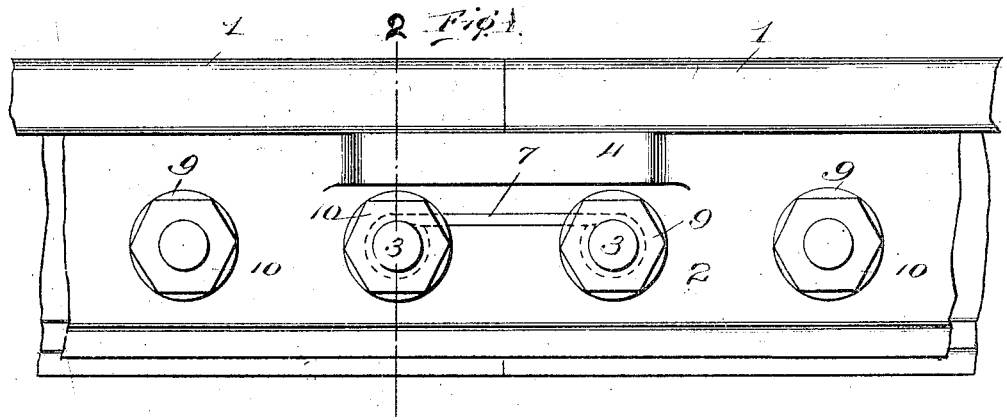
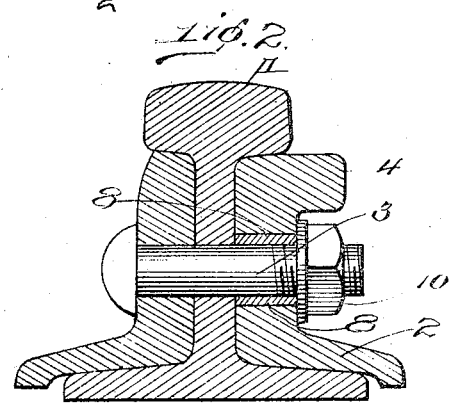
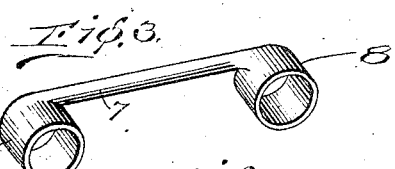
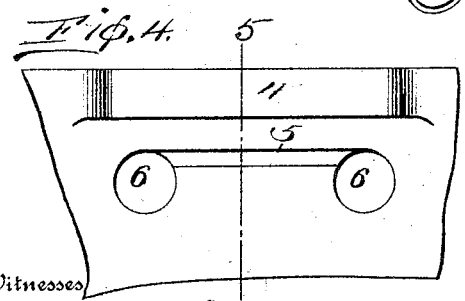
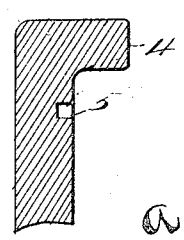
Witnesses
J. M. Fowler Jr.
C. S. Wilson
Inventor
A. Light
By Mason Fenwick & Lawrence
Attorneys

UNITED STATES PATENT OFFICE.

ALBIN LIGHT, OF SPADRA, ARKANSAS.

RAIL-BOND.

No. 916,882.

Specification of Letters Patent.

Patented March 30, 1909.

Application filed September 17, 1908. Serial No. 453,442.

*To all whom it may concern:*

Be it known that I, ALBIN LIGHT, a citizen of the United States, residing at Spadra, in the county of Johnson and State of Arkansas, have invented certain new and useful Improvements in Rail-Bonds; and I do hereby declare the following to be a full, clear, and exact description of the invention, such as will enable others skilled in the art to which it appertains to make and use the same.

This invention relates to rail bonds and has for an object to provide a bond more closely connected with a rail than in the ordinary method of bonding.

A further object of the invention is to provide a bond having sleeves adapted to surround some of the bolts connecting the rail and fish plates which said sleeves are directly in contact with the surfaces of the rail.

A further object of the invention is to provide a fish plate adapted for co-action with the improved form of bond.

With these and other objects in view, the invention comprises certain novel constructions, combinations and arrangements of parts, as will be hereinafter described and claimed.

In the drawings:—Figure 1 is a view in side elevation of rail ends connected by a fish plate with the improved bond secured thereon. Fig. 2 is a view in transverse section of a rail, fish plate and bond taken on line 2—2 of Fig. 1. Fig. 3 is a perspective view of the improved bond. Fig. 4 is a view in side elevation of a fragment of the fish plate showing the accommodation for the bond. Fig. 5 is a view in transverse section of the fish plate as on line 5—5 of Fig. 4 showing the groove for the accommodation of the bond.

Like characters of reference designate corresponding parts throughout the several views.

The improved bond forming the subject-matter of this application is adapted for use in association with the usual and ordinary rails, fragments of which are shown at 1—1 with their ends substantially meeting and held by a fish plate 2 and bolts 3. The fish plate, while any ordinary and common construction may be employed, is preferably provided with a lip 4 outstanding substantially from the middle and extending partly or entirely over the nut ends of the bolts 3, forming thereby protection for the bolts as well as protection for the bond hereinafter described.

Longitudinally of the fish plate a groove 5 is formed connecting opening 6 in the fish plate through which the bolts 3 extend and larger in diameter than the diameter of such bolts. Within the groove 5 a bond 7 is located, such bond being formed with sleeves 8 at opposite ends thereof of proper exterior diameter to slide within the opening 6 and of proper interior diameter to properly fit upon the bolts 3. The sleeves 8 are of such length that the extremities when in position engage the surface of the rail 1 as shown particularly in Fig. 2 and are held in position by means of washers 9 and nuts 10, whereby the end of the sleeve 8 is clamped firmly in contact with the surface of the rail. It will be apparent that by forcing the sleeves upon opposite ends of the bond into intimate engagement with the rails themselves, a more perfect electrical contact is provided, thus preventing leakage of return current. It is customary, of course, to make such bond from copper which is an expensive material and in ordinary use the bonds extend somewhat more than the length of the fish plate and engage the rails upon opposite sides of such plate thereby using a large quantity of copper in their manufacture.

In the present invention the sleeves may be formed by simply flattening the end of the wire and forming it into the shape of a sleeve and when inserted within the opening 6 of the fish plate form proper contact with the rail by the employment of only sufficient wire to extend between adjacent bolts.

What I claim is:

1. In a device of the class described, adjacent rail sections, a fish plate provided with bolt openings, bolts inserted through such opening smaller in diameter than the openings, and bonds inserted within the openings of some of the bolts of each rail section.

2. In a device of the class described, a fish plate, bolts adapted to clamp the fish plate in position, said bolts extending through openings in the fish plates greater in diameter than the bolts, and a bond extending between the bolts and within the openings about such bolts.

3. In a device of the class described, a fish plate provided with bolt openings, a groove extending between the bolt openings, and a bond seated in the groove and provided with sleeves within the bolt openings.

4. In a device of the class described, a fish plate provided with bolt openings, a groove extending between the bolt openings, and a bond seated within the groove and terminating in sleeves disposed within the bolt openings and of a length substantially equal to the thickness of the fish plate.

5. The combination with rail ends, of a fish plate adapted to hold the rail ends and provided with bolt openings, bolts for the openings smaller in diameter than the openings, such fish plate being provided with a groove extending between the bolt openings, a bond disposed within the openings and embracing the bolts, and means to clamp the sleeve into engagement with the rail and the fish plate upon the rail.

In testimony whereof I affix my signature in presence of two witnesses.

ALBIN LIGHT.

Witnesses:
ARTHUR H. ROSE,
EVERETT H. JONES.